United States Patent [19]

Shamshirian

[11] Patent Number: 5,261,076

[45] Date of Patent: Nov. 9, 1993

[54] METHOD FOR PROGRAMMING A PIN COMPATIBLE MEMORY DEVICE BY MAINTAINING A RESET CLOCK SIGNAL LONGER THAN A REGULAR RESET DURATION

[75] Inventor: Massoud Shamshirian, Fremont, Calif.

[73] Assignee: Samsung Semiconductor Inc., San Jose, Calif.

[21] Appl. No.: 453,710

[22] Filed: Dec. 20, 1989

[51] Int. Cl.⁵ .................. G06F 1/22; G06F 15/00
[52] U.S. Cl. ....................... 395/500; 365/189.05; 395/800; 364/DIG. 1; 364/232.8; 364/261.2; 364/271.5
[58] Field of Search ............ 364/200, 900; 395/800; 365/189.05

[56] References Cited

U.S. PATENT DOCUMENTS

| | | | |
|---|---|---|---|
| 4,432,049 | 2/1984 | Shaw | 364/200 |
| 4,486,827 | 12/1984 | Shima et al. | 361/200 |
| 5,097,913 | 3/1992 | Mensch, Jr. | 395/775 |

FOREIGN PATENT DOCUMENTS 57-41732  3/1982  Japan .
63-101939  5/1988  Japan .

Primary Examiner—Thomas C. Lee

Attorney, Agent, or Firm—Cushman Darby & Cushman

[57] ABSTRACT

A programmable buffer chip and programming method therefor are provided in which program information is entered into the buffer chip during a time period appended to the end of an ordinary reset period and so disguised as an extension of the reset period. Program information determines the buffer status conditions to be monitored at buffer status pins, and includes first offset data and a second offset data. A non-zero value in the first offset data indicates an offset defining an almost-full condition to be monitored. A non-zero value in the second offset data indicates an offset defining an almost-empty condition to be monitored. A program indicator bit in the program information indicates whether the buffer half-full condition, or both the full and the empty condition will be monitored at a particulat buffer status pin. The buffer is programmed by first causing the buffer chip to enter a reset mode, and then entering the program information in a disguised reset period following the actual reset period. Accordingly, the buffer requires no dedicated programming pin and is made backward compatible with a nonprogrammable basic buffer chip having the same number of I/O pins. The program information may also include an indication to the buffer chip whether to inhibit from resetting upon next entering the reset mode.

26 Claims, 7 Drawing Sheets

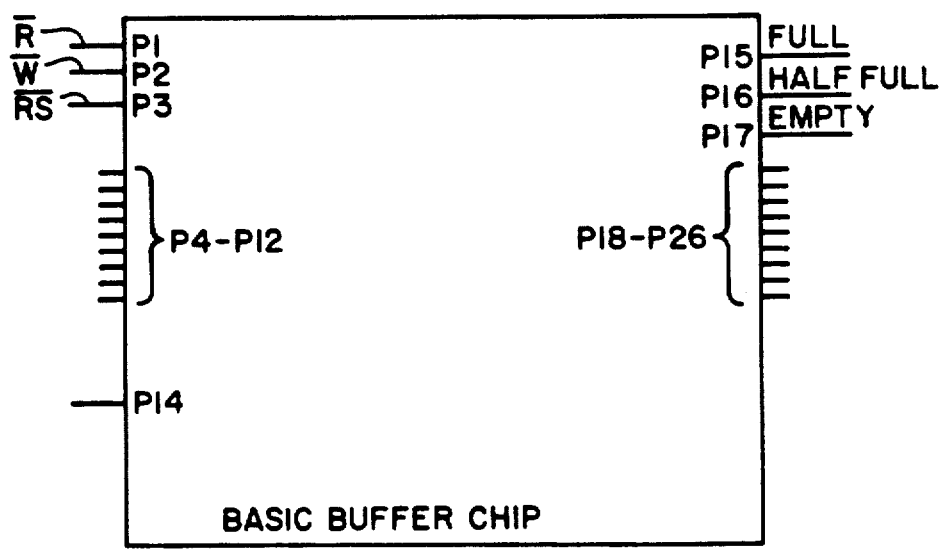
FIG. IA
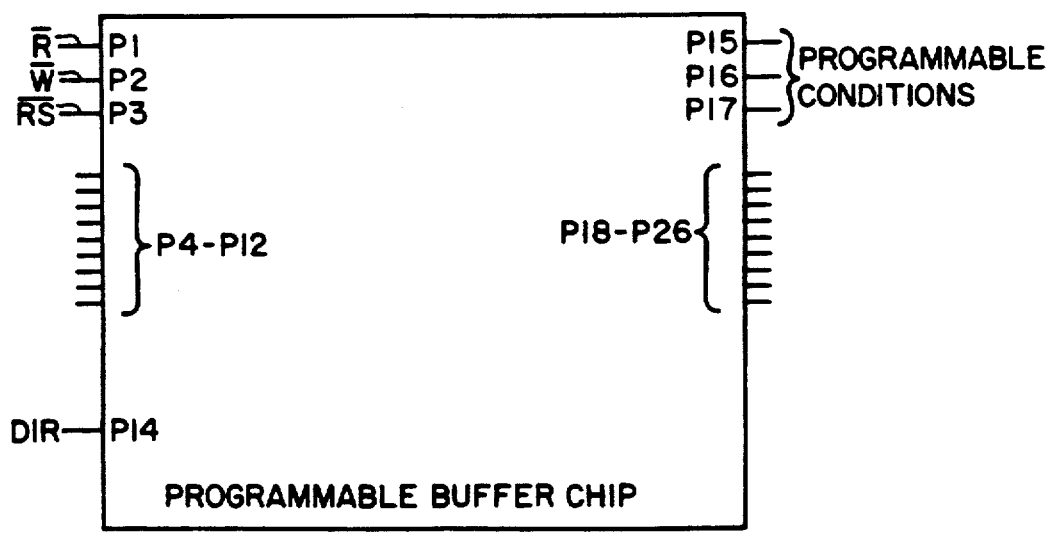
FIG. IB

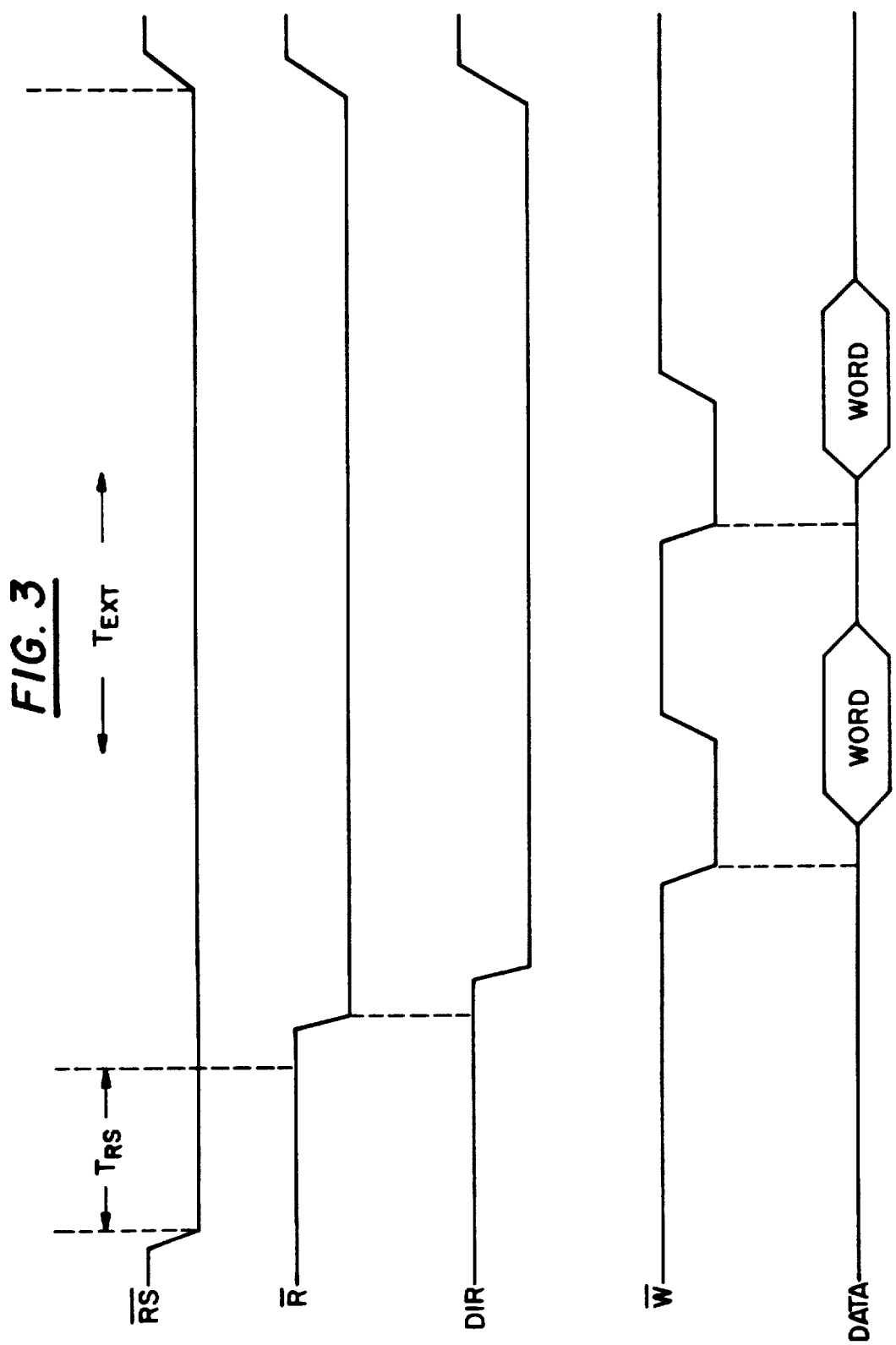

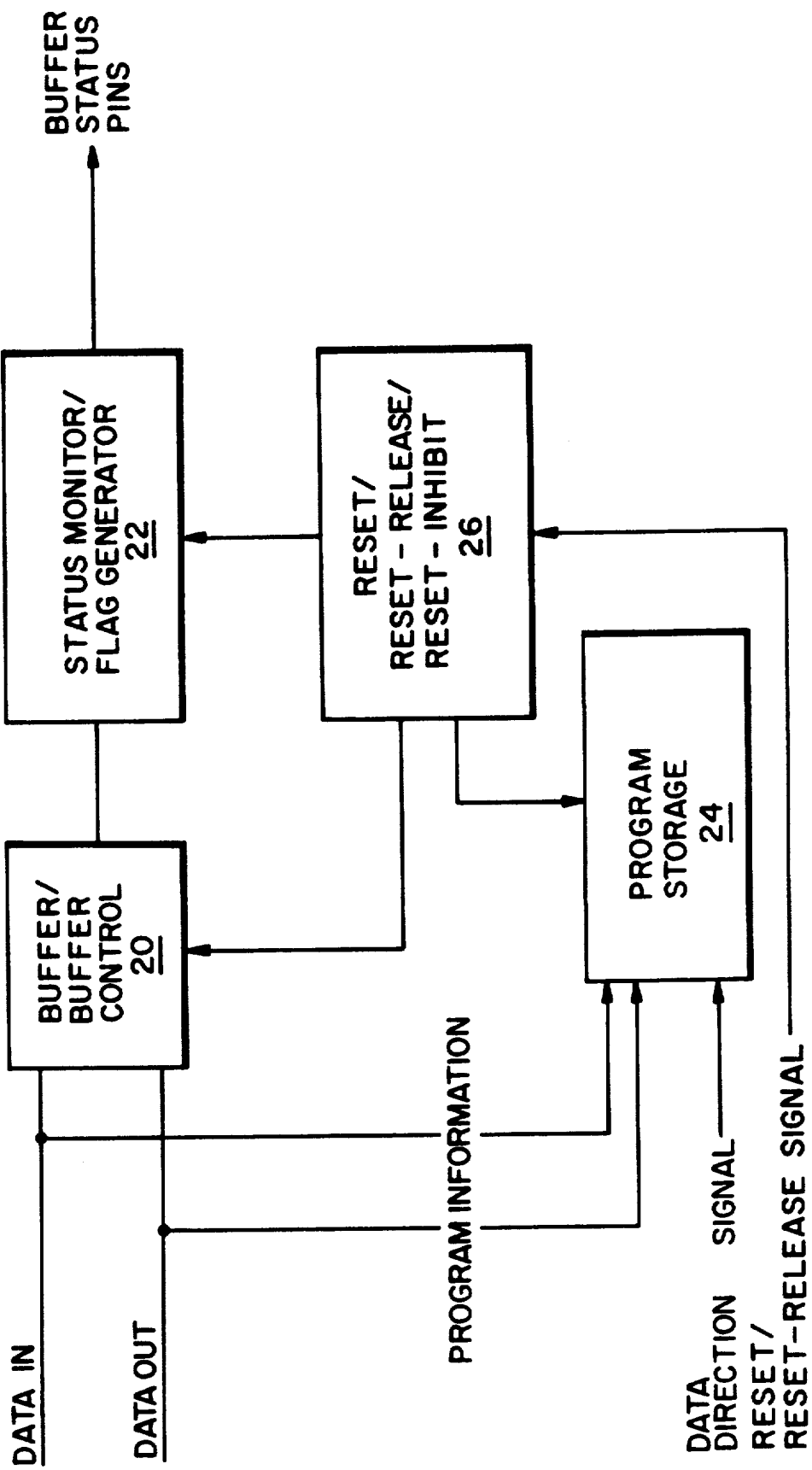

METHOD FOR PROGRAMMING A PIN COMPATIBLE MEMORY DEVICE BY MAINTAINING A RESET CLOCK SIGNAL LONGER THAN A REGULAR RESET DURATION

BACKGROUND OF THE INVENTION

1. Field of the Invention

This invention relates to programmable buffers which are made on a single integrated circuit chip and a programming method for such buffers. Buffers are data storage devices generally used for data transfer, to which data elements can be written in from one source and read out to another. Whether or not programmable, buffers made on a single chip are referred to as buffer chips; such buffers communicate with the external environment through I/O pins of the buffer chips in which they are embodied. Generally, a buffer chip includes designated buffer status pins for indicating certain monitored buffer status conditions, such as full, empty, half-full, etc. By programmable, it is meant that the particular buffer conditions which are monitored and indicated to the external environment at certain buffer status pins are changeable by external selection; the procedure for entering program information is referred to as programming. Entering program information into the buffer chip programs the buffer chip. Programmability allows a user of the buffer chip to change the buffer status conditions that are monitored, according to the particular requirement of the application environment in which the buffer chip is configured. Without the programming feature, the monitored buffer status conditions are not changeable, which limits the usefulness of the buffer chip.

2. Description of the Prior Art

Programmable buffer chips are known in the prior art. Programmability is not itself the subject of this invention. Rather, this invention is directed to a particular method of programming which eliminates a major disadvantage common to all programmable buffer chips in the prior art, and to a buffer chip which is programmable by such a method. That major disadvantage of programmable buffer chips belonging to the prior art is the problem of compatibility, i.e., backward compatibility with buffer chips which are not programmable.

Compatibility in the context of the present invention means interchangeability. A programmable buffer chip is compatible to a non-programmable buffer chip if the non-programmable buffer chip can be removed from its position in an original circuit and replaced by the programmable buffer chip, pin for pin, without causing a malfunction in the original circuit. The original circuit would continue to operate as it otherwise would with the basic non-programmable buffer chip. Compatibility in that sense is backward, as the more advanced buffer chip having the programming feature is made compatible with the basic buffer chip not having the programming feature. Nevertheless, compatibility has never been achieved. No prior programmable buffer chip is known which is compatible with a nonprogrammable basic buffer chip having the same number of functional I/O pins.

The use of dedicated programming pins in the prior art is one reason why compatibility cannot be achieved in the past. A dedicated programming pin is one at which the signals applied thereto relate exclusively to programming of the buffer chip. Where there is such a dedicated programming pin in a programmable buffer chip, when the programmable buffer chip is substituted for the basic non-programmable buffer chip, a number of conflicts may arise. There may be an incongruity in the number of pins, or there may be a situation in which the original system not designed for operating with a programmable buffer chip may send signals to the dedicated programming pin. In either case, the system would not obtain a proper response from the substituted buffer chip.

SUMMARY OF THE INVENTION

According to one aspect of the invention, a method is provided for entering program information into a programmable buffer chip, which achieves compatibility between the programmable buffer chip and a nonprogrammable basic buffer chip with the same number of I/O pins. The method creates a time period disguised as an extended reset period, which is appended to the end of an actual reset period. During that disguised time period, program information is entered into the buffer chip, thus programming the buffer chip. The program information selects the buffer status conditions to be monitored. The monitored conditions are indicated by at least one buffer status pin.

According to another aspect of the invention, a programmable buffer chip is provided to which the programming method of the present invention can be applied. The programmable buffer chip receives program information during a time period appended to the end of an ordinary reset period, disguised as an extension of the reset period.

The present invention is based on the existence of a resetting feature in the nonprogrammable basic buffer chip. The basic buffer chip is responsive to a reset signal for going into a reset mode for a predetermined period of minimal duration in which resetting operations are performed for returning the buffer chip to a predetermined initial condition (e.g., setting flags to indicate the buffer is empty). After that period, the basic buffer chip is responsive to a reset-release signal for terminating the reset mode to engage in normal non-reset buffer operations for receiving, storing, and outputting data elements. The period provided for resetting must be sufficient for completion of the resetting operations.

According to the present invention, upon occurence of the reset signal, the programmable buffer chip enters a reset mode of sufficient predetermined duration to perform resetting operations. The reset-release signal is not applied to the programmable buffer chip for a further time period subsequent to the reset period; At the end of that further time period, the reset-release signal is applied. That further time period is thus appended to the end of the actual reset period, and appears as a disguised extension of the reset period. The programmable buffer is programmed during that disguised time period, as program information is entered into the buffer chip during that period.

The programming method described above requires that the buffer chip perform resetting operations each time it is programmed, because the programming period is a disguised extension of the reset period. According to another embodiment of the invention, actual resetting operations are inhibited during the ordinary reset period preceding the disguised period for programming, so that the programmable buffer chip would not engage in resetting operations each time it is to be programmed.

Compatibility is achieved by the present invention, pin for pin, between a programmable buffer chip and a non-programmable basic buffer chip, when the programmable buffer chip is substituted for a nonprogrammable basic buffer chip in an original system designed to operate with the basic buffer chip. No conflict could arise by that substitution because the original system would not, absent a malfunction, operate to append an extended time period to the end of a normal reset period, or attempt to enter program information into the buffer chip during such an appended time period disguised as an extension of the reset period.

BRIEF DESCRIPTION OF THE DRAWINGS

FIG. 1A illustrates a plane external view of a non-programmable basic buffer chip with the I/O pins which are pertinent to a disclosed embodiment of the present invention.

FIG. 1B illustrates a plane external view of a programmable buffer chip with the I/O pins which are pertinent to a disclosed embodiment of the present invention.

FIG. 3 illustrates the timing of events in a disclosed embodiment of the steps involved in the method according to the present invention.

FIG. 6 is a block diagram illustrating the structural arrangement of a programmable buffer chip according to another embodiment of the invention.

DETAILED DESCRIPTION OF PREFERRED EMBODIMENTS

Figure 2A:
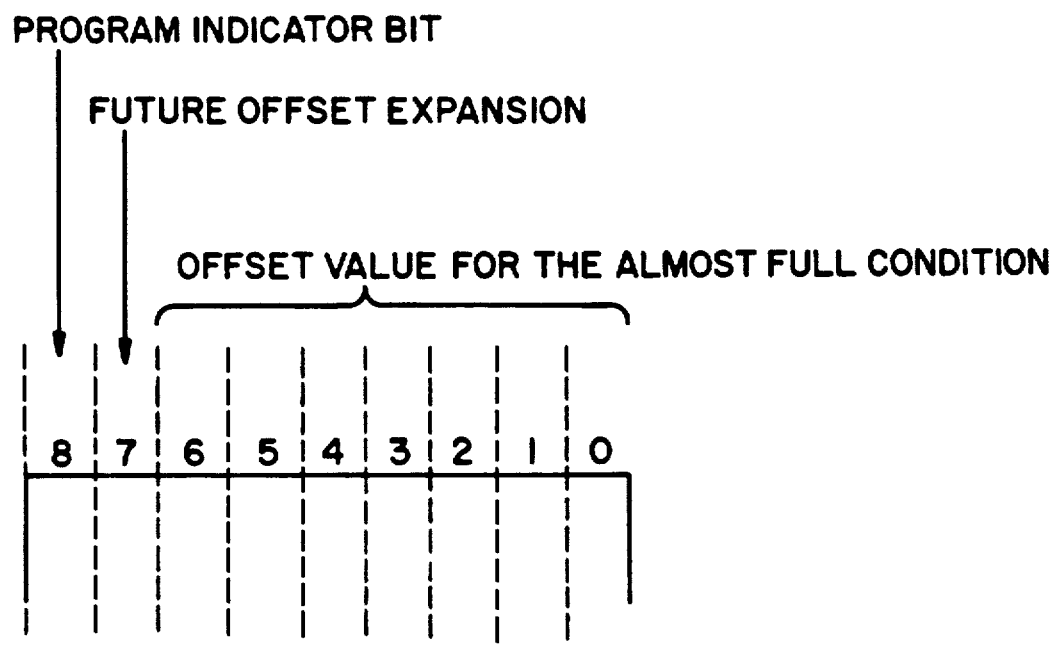
FIGS. 2A and 2B together illustrates two program registers included within a programmable buffer chip according to one embodiment of the present invention.

In FIG. 1A, a nonprogrammable basic buffer chip 2 is shown. It has a plurality of I/O pins, only some of which are identified in FIG. 1A. P1 designates a read control pin for initiating a read operation; the signal Read Bar is applied to P1 and initiates a reading of the buffer when it goes low. P2 designates a write control pin for initiating a write operation; the signal write bar is applied to P2 and initiates a write operation when it goes low. P3 designates a reset control pin for initiating a sequence of resetting operations within the buffer chip 2; the signal Reset Bar is applied to P3.

The Reset Bar signal has two functional roles. When Reset Bar goes Low, it acts as a Reset Signal placing the buffer chip in a reset mode to perform resetting operations, provided that the control signals at P1 and P2 are both high at that time. The reset period commences upon the application of the Reset Signal. When Reset Bar reverts to High, it acts as a Reset-Release Signal terminating the reset mode, thus causing the buffer chip to exit the reset mode to engage in normal non-reset buffer operations.

P4 through P12 are data input pins for nine bit data words; P18 through P26 are data output pins for nine bit data words. P14 is a control signal pin which has no functional significance during the time in which the basic buffer is in the reset mode for performing resetting operations; thus, it can be any one of a number of control pins on a basic buffer chip. P15, P16, and P17 are buffer status pins which monitor certain buffer status conditions by the signal level indicated thereat; P15 monitors the buffer full condition by yielding a predetermined signal level when the buffer is full; P16 monitors the buffer half-full condition by yielding a predetermined signal level when more than half of the buffer locations have been written into but not yet read; P17 monitors the buffer empty condition by yielding a predetermined signal level when the buffer is empty. In the basic buffer chip 2, the buffer status conditions full, half-full, and empty, are fixed and cannot be changed; thus, the basic buffer chip 2 is not programmable.

The illustrated basic buffer chip implements a first-in-first-out sequence of data transfer; data elements are read out of the buffer within the buffer chip and outputted from the buffer chip in the same sequence as that in which they were inputted into the buffer chip and written into the buffer. The buffer is considered empty when no data element has been written into the buffer, or all elements written into the buffer have been read out; the buffer is considered full when all locations within the buffer are filled with a data element and none of them has been read out; the buffer is considered half full when more than half of the buffer locations contain data elements which have been written into the buffer but not yet read.

In FIG. 1B, a programmable buffer chip 4 is shown. It has the same number of I/O pins in the same physical arrangement as the basic buffer chip 2. Each pin of the basic buffer chip has a corresponding pin in the programmable buffer chip. Like the basic buffer chip, the programmable buffer chip includes a read control pin P1, a write control pin P2, a reset control pin P3, data input pins P4 through P12, buffer status pins P15 through P17 (the conditions monitored being changeable by programming), data output pins P18 through P26, and Data Direction Pin P14.

Data Direction Pin P14 in the programmable buffer chip is used to implement a feature of selectively entering program information into the chip from one of two sets of I/O pins. A signal of one level applied to pin P14 indicates that data pins P4 through P12 are used for entering program information, and a signal of another level applied to pin P14 indicates that pins P18 through P26, which are normally data output pins, are used for entering program information. Because corresponding pin P14 in the basic buffer chip as described above has no functional significance during the reset mode, use of P14 for programming by a programmable buffer chip can be made compatible with the basic buffer chip if the programming is done while the buffer chip remains in the reset mode. In an alternative embodiment in which the identity of pins used for entering program information is fixed, the Data Direction Pin P14 need not be provided for the purpose of selecting pins; rather, it could have the same function as that of a corresponding pin in the basic buffer chip.

In the programmable buffer chip 4, P15 may be made to monitor an almost-full condition, defined by the buffer's being full but for a number of locations specified by an offset value inputted into the buffer chip as part of program information by a user; P17 may be made to monitor an almost-empty condition, defined by the buffer's being empty but for a number of locations specified by an offset value inputted into the buffer chip as part of the program information; P16 may be made to monitor the buffer half full condition, or either the buffer full or the buffer empty condition, by an indication within the program information inputted into the buffer chip. When P16 is made to monitor either the buffer full or the buffer empty condition, which condition is indicated by P16 can be determined by checking the status of the almost-full condition indicated by P15 or the almost-empty condition indicated by P17; if the buffer is almost full, then an affirmative indication at P16 should be interpreted by the external world as the full condition; if the buffer is almost empty, then an affirmative indication at P16 should be interpreted by the external world as the empty condition. Simple gating logic is used to make that interpretation. Furthermore, the program information may include an indication that pins P15, P16, and P17 are to be set to monitor the same conditions as those monitored by pins P15, P16, and P17 of the basic buffer chip.

Though the physical pin arrangement is the same between the basic buffer chip 2 and the programmable buffer chip 4, the specific arrangement shown in FIGS. 1A and 1B is solely for convenient illustrative purposes. In order to effect compatibility such that a programmable buffer chip could replace a basic buffer chip in a system not designed for programming, a method for programming, i.e., a method for entering program information into the programmable buffer chip, is required which makes use only of the pins already present on the basic buffer chip.

The program information contemplated by a preferred embodiment of this invention is in the form two nine bit program instruction words. The first instruction word is allotted seven bits for specifying an offset (first offset data) for the almost-full condition; each offset increment corresponds to a two byte offset in the buffer. Thus, the almost-full condition may cover a range including 127×2 bytes from the actual full condition, if the first offset in the instruction word corresponds to the condition in which the buffer is full except for two bytes of data. Similarly, the second instruction word is allotted seven bits for specifying an offset (second offset data) for the buffer empty condition; each offset increment corresponds to a two byte offset in the buffer. Thus, the almost-empty condition may cover a range including 127×2 bytes from the actual empty condition, if the first offset in the instruction word corresponds to the condition in which the buffer is empty except for two bytes of data. Depending on the size of the buffer itself, more or less number of offset bits in the instruction words may be desirable. For a 1K by 9 bit FIFO buffer, seven offset bits in each instruction word is a suitable selection; for a 512 by 9 bit FIFO buffer, six offset bits in each instruction words is a suitable selection. Also, how many bytes correspond to each offset increment depends on the application environment and thus can vary in different embodiments.

Figure 2B:
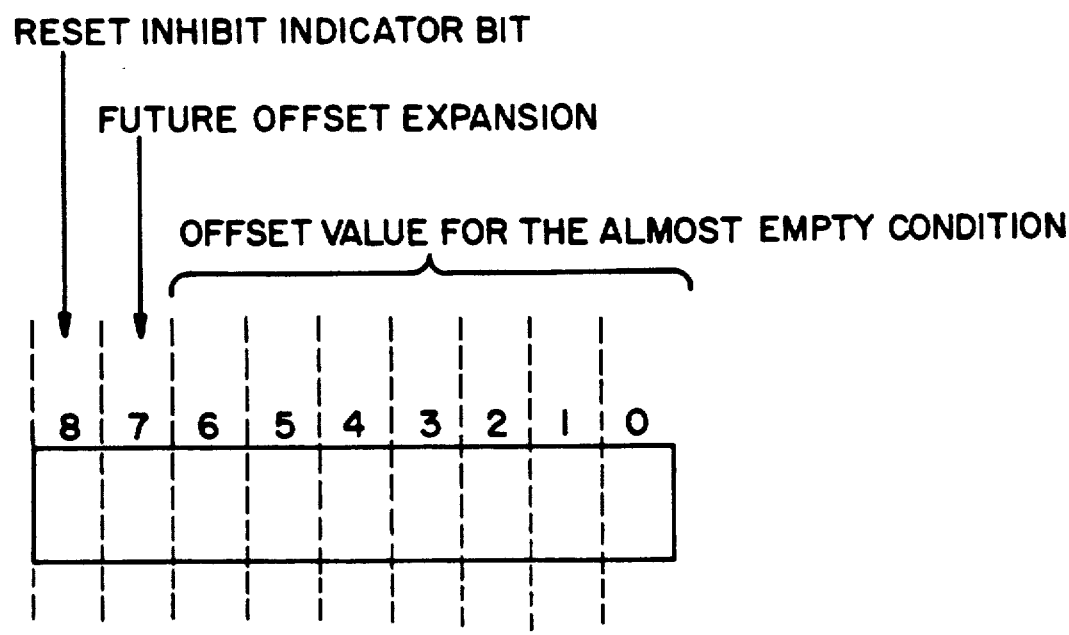

FIG. 2 illustrates the first and the second program instruction words. The first program instruction word would be stored within a Full Flag Program Register and the second program instruction word would be stored within an Empty Flag Program Register incorporated within the programmable buffer chip 4 of FIG. 1B. Those program registers are used for receiving and storing program information. Because the basic buffer chip 2 is not programmable, it would not include any program register as such for storing program information. Both program registers would be nine bits long, each storing a nine bit program instruction word. The Full Flag Program Register operates to store the first instruction word which contains the offset information for the almost-full condition (first offset data), and the Empty Flag Program Register operates to store the second instruction word which contains the offset information for the almost-empty condition (second offset data).

Bit 7 of the first and second program instruction words (the eighth bit, counting from bit zero) is reserved for future offset expansion. Until that time, they are not used, and can contain a dummy bit.

Bit 8 of the first program instruction word (the ninth bit, counting from bit zero), hereinafter referred to as the program indicator bit, determines whether the programmable buffer 4 defaults to monitor one or more of the same conditions as those monitored by the basic buffer chip 2. In one embodiment, when the program indicator bit is set low, it is intended that the programmable buffer would respond thereto by using P15 to indicate the buffer full condition, P16 to indicate the buffer half-full condition, and P17 to indicate the buffer empty condition, as in the case of the basic buffer chip; when the program indicator bit is set high, it is intended that the programmable buffer chip would use P15 to indicate the almost-full condition according to the first offset data in the first instruction word of the program information, P17 to indicate the almost-empty condition according to the second offset data in the second instruction word of the program information, and P16 to indicate both the full and the empty condition. When P16 is used to indicate both the full and the empty conditions, the identity of the condition indicated can be determined by examining P15 and P17; if the almost-full indication is provided at P15, then an affirmative indication at P16 would represent the full condition; if the almost-empty condition is provided at P17, then an affirmative indication at P16 would represent the empty condition. Thus, if the program indicator bit is set high, four conditions are monitored: almost-full, almost-empty, full, and empty; the full and empty conditions are indicated by the same buffer status pin.

In another embodiment, the program indicator bit only determines whether P16 would function in the same manner as would P16 in the case of the basic buffer chip. Whether P15 would indicate the almost-full condition, or default to indicate the full condition like P15 of the basic buffer chip depends on the value of the first offset data. Whether P17 would indicate the almost empty condition, or default to indicate the empty condition like P17 of the basic buffer chip depends on the value of the second offset data. If the first offset data is zero, then the programmable buffer chip would respond by implementing P15 to indicate the full condition (like in the case of the basic buffer chip); if the first offset data is non-zero, then the programmable buffer chip would automatically respond by implementing P15 to indicate the almost-full condition with the offset specified by the first offset data. If the second offset data in the second program word is zero, then the programmable buffer chip would respond by implementing P17 to indicate the empty condition (like in the case of the basic buffer chip); if the second offset data is non-zero, then the programmable buffer chip would automatically respond by implementing P17 to indicate the almost-empty condition with the offset specified by the second offset data. In this embodiment, of course, the programmable buffer chip includes logic circuitry to examine the value of each offset data, and the combination of the program indicator bit, the first offset data, and the second offset data, together indicates whether the same or different buffer status conditions monitored by the basic buffer chip are monitored by corresponding pins in the programmable buffer chip.

Bit 8 of the second program instruction word (the ninth bit, counting from bit zero) determines whether the programmable buffer chip is to inhibit its resetting operations the next time it should otherwise validly go into reset mode. It is a reset inhibit indicator bit. The significance of that feature will be apparent in light of further discussions in this specification. It provides an option for not resetting the buffer each time the programmable buffer chip is being programmed. In an alternative embodiment in which the option is not provided, the reset inhibit indicator bit need not be included in the program information.

To provide a proper understanding of the programming method according to the present invention, the reset feature of the basic buffer chip 2 is first described.

By resetting, it is meant that the buffer is initialized to a predetermined state in preparation for receiving a new batch of data elements. For instance, if the buffer is half-full after having received a first batch of elements, resetting would return it to an initial state as though it is presently empty with no data elements having been written into the buffer. After resetting, the buffer is ready to receive a new batch of data elements. If pointers are used in the buffer to point to certain locations of the buffer relating to the present state of the buffer, they would be initialized to a condition relating to the initial buffer state.

In the basic buffer chip 2, when the Reset Signal is applied to pin P3, the buffer chip is placed in a reset mode and the buffer chip begins a sequence of resetting operations, provided that the read bar and the write bar signals are both high. After a sufficient period of time has passed for the resetting operations to be completed, the Reset-Release Signal is applied to pin P3, which terminates the reset mode by causing the buffer chip to exit the reset mode to engage in normal non-reset buffer operations.

The programming method according to the present invention relies on the manner in which the basic buffer chip enters and exits the reset mode. For that reason, a programmable buffer chip intended for use with the programming method according to the present invention must implement the same mechanism for entering and exiting the reset mode, if backward compatibility with that basic buffer chip is to be achieved.

The programming method according to the present invention appends an extended time period to the end of the reset period, disguised as an extension of the reset period. During that disguised time period, program information is entered into the programmable buffer chip while the chip is otherwise in an idle state as though it is still being reset, although resetting operations are already completed. Entering the program information in that manner makes the programmable buffer chip compatible with a corresponding basic buffer chip which is not programmable. That is because when the programmable buffer chip is placed in an environment designed for a basic buffer chip, the circuits in that environment would not operate to create a disguised reset extension period to be appended to the end of the normal reset period, or attempt to enter program information during that period. Absent the disguised reset extension period for programming, the programmable buffer chip behaves as if it were not programmable.

FIG. 3 illustrates the timing of events surrounding the sequence of steps to be taken for entering program information in the form of two program instruction words into the programmable buffer chip 4. At first, the reset bar signal, read bar signal, and the write bar signal are all high; when the reset bar signal is sent low, the sequence of resetting operations is started within the programmable buffer chip 4, as in the case of the basic buffer chip 2. A predetermined period of minimal duration is required for the sequence of resetting operations to be performed; that period is indicated in FIG. 3 as $T_{rs}$. Ordinarily in a basic buffer chip, at the end of the period period $T_{rs}$, the Reset-Release Signal (reset bar signal reverting to High) is applied to pin P3 to terminate the reset mode. But for entering program information into the programmable buffer chip 4, application of the Reset-Release Signal is delayed for an extended period $T_{ext}$ beyond the period $T_{rs}$. The period $T_{ext}$ is an extended reset period in disguise, during which program information is entered into the programmable buffer chip. As shown in FIG. 3, $T_{ext}$ is appended to the end of the normal reset period $T_{rs}$. During the period $T_{ext}$, the read bar signal is first sent low to alert the programmable buffer chip 4 that program information are about to be entered; then, it is reverted to high. In alternative embodiments, some other signal may be used for that purpose; it is only necessary that some signal after the period $T_{rs}$ alerts the programmable buffer chip of the incoming first and second program instruction words. Thereafter, first and second program instruction words are entered into the programmable buffer chip 4 one after the other.

For each instruction word, the write bar signal is first sent low before the instruction word is entered; the write bar signal remains low for a duration and reverts back to its initial state in preparation for going low again. Thus, the write bar signal is toggled twice, once for entering each program instruction word. As already stated, the first program instruction word contains offset information relating to the buffer almost full condition and is stored in the Full Buffer Flag Register; the second program instruction word contains offset information relating to the buffer almost empty condition and is stored in the Empty Buffer Flag Register. In an alternative embodiment, the sequence of first and second program instruction words may be reversed.

In an embodiment implementing the Data Direction Pin P14, the direction signal DIR is applied to the Data Direction Pin P14 immediately prior to the first toggling of the write bar signal during the $T_{ext}$ period. Thus, the state of the DIR signal informs the programmable buffer chip 4 which set of pins, either P4 through P12 or P18 through P26, will communicate the program instruction words to be entered into the programmable buffer chip 4. In one implementation, the low state selects pins P4 through P12 and the high state selects P18 through P26. That selection can be reversed in an alternative implementation.

As described above, the program information is inputted into the programmable buffer chip 4 during the $T_{ext}$ period, a disguised extension of the normal reset period. The inputting process in the particular embodiment shown includes sending the read bar signal low, applying a direction signal DIR bar to pin P14, and then toggling the write bar signal once for entering one program instruction word and another time for entering a second program instruction word (the instruction words being entered via the set of data I/O pins selected by the signal at pin P14).

According to the embodiment described above, each time the programmable buffer chip is programmed, it also performs resetting operations during the period $T_{rs}$ which precedes the period $T_{ext}$. That may not be desirable. In an alternative embodiment, the program information can be made to contain an indication of whether the programmable buffer chip would refrain from initiating resetting operations the next time it otherwise would. Bit 8 (the ninth bit, counting from bit zero) of the second program instruction word is used for that purpose. One state of that bit indicates to the programmable buffer chip 4 that it is not to conduct reset operations in the next $T_{rs}$ period; the other state of that bit indicates to the programmable buffer chip 4 that it is to reset as it otherwise normally would in the next $T_{rs}$ period.

Though the basic buffer chip as described above includes a single reset pin to which both the Reset Signal (reset bar signal going Low) and the Reset-Release signal (reset bar signal reverting to High) are applied, some basic buffer chips may have a different implementation. For basic buffer chips which include separate pins for receiving a Reset Signal and a Reset-Release Signal, compatible programmable buffer chips should include corresponding separate pins.

Figure 4A:
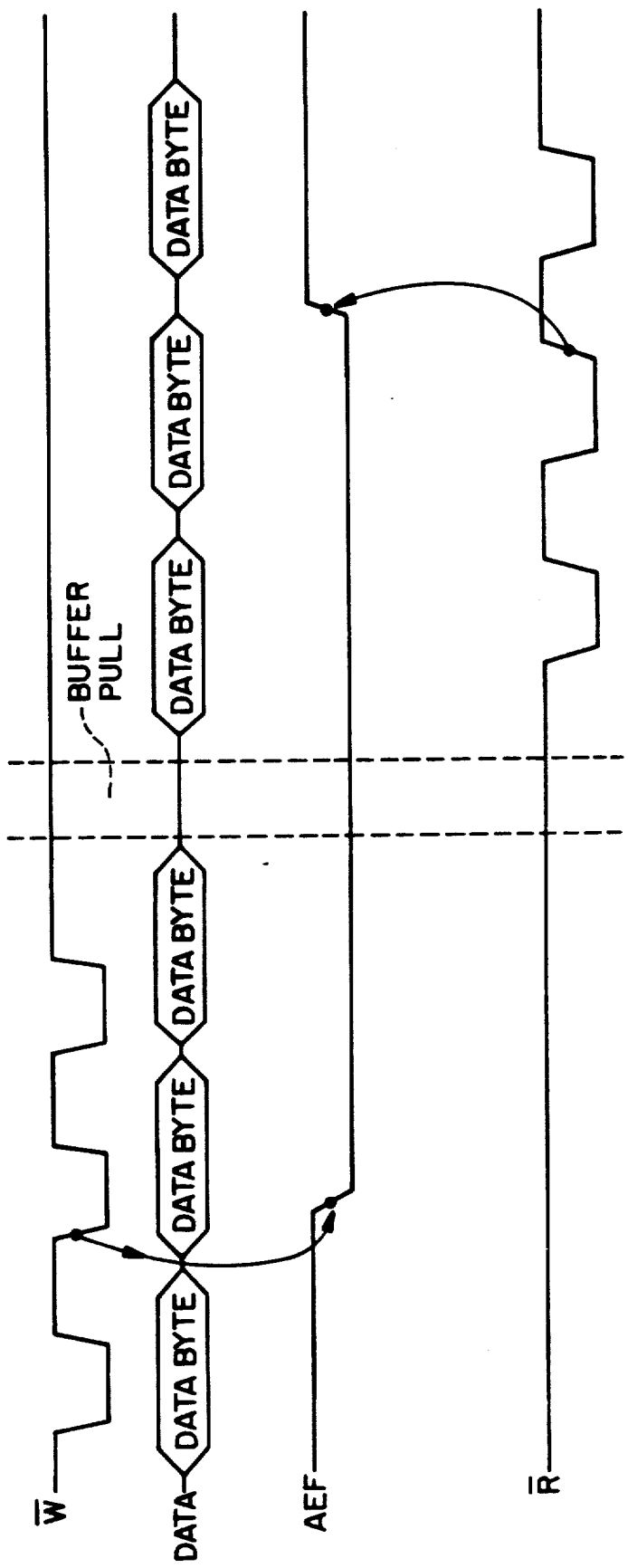
FIG. 4A illustrates the assertion and deassertion of the almost full flag according to program information entered into a programmable buffer chip.
Figure 4B:
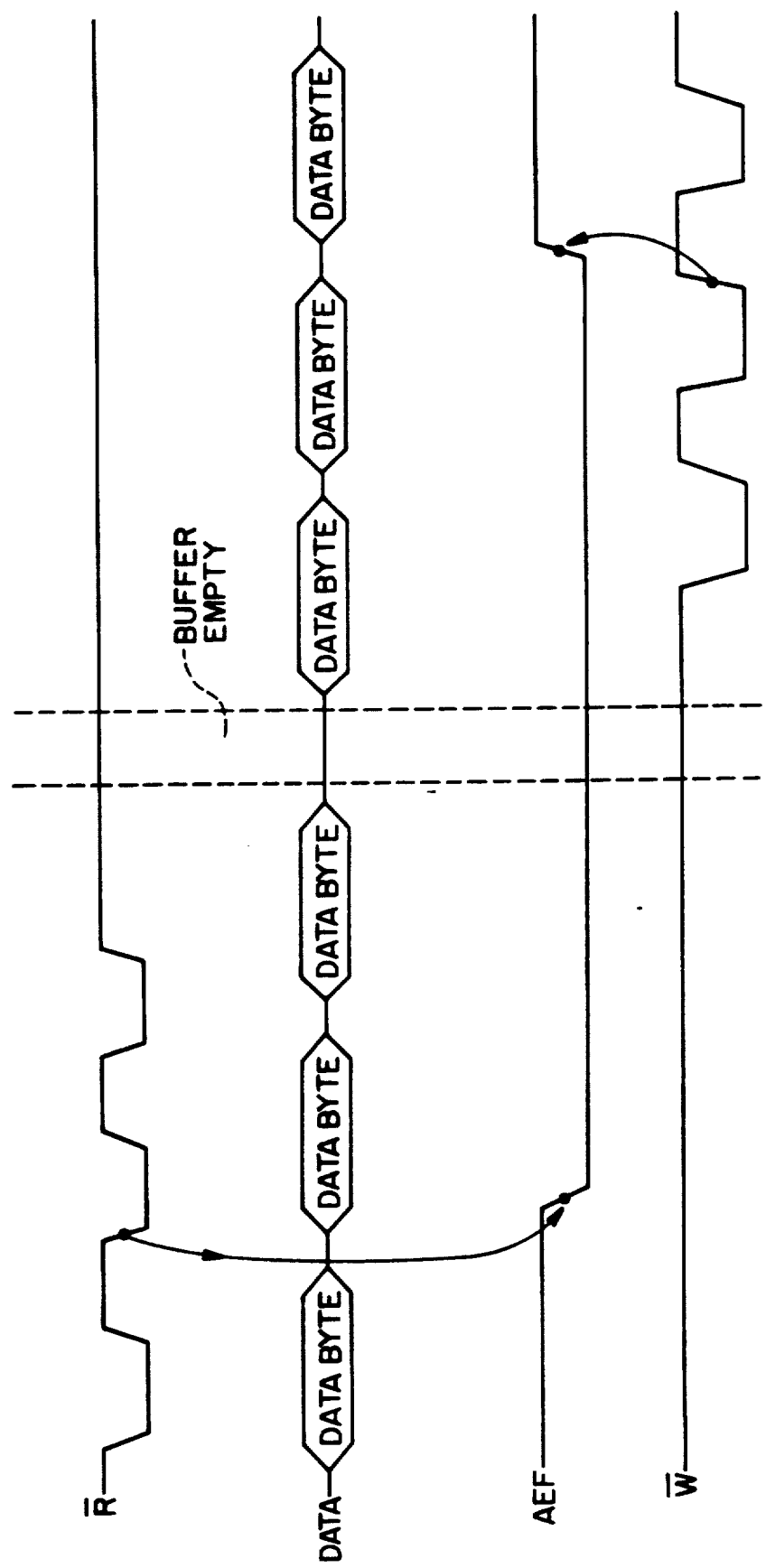
FIG. 4B illustrates the assertion and deassertion of the almost empty flag according to program information entered into a programmable buffer chip.

FIG. 4A illustrates the assertion and deassertion of the almost full signal (flag) AFF, and FIG. 4B illustrates the assertion and deassertion of the almost empty signal (flag) AEF, according to a preferred embodiment of the invention. For convenience of illustration, a two byte offset is presumed for the almost full condition, and a two byte offset is presumed for the almost empty condition (each offset increment in the first and second offset data corresponds to an offset of two bytes in the buffer).

Each time the write bar signal goes low during normal buffer operations, a write cycle for a data element, i.e., a byte of data, is initiated; the write bar signal reverts to high before the next write cycle is initiated. During the write cycle, a data byte is written into the buffer chip; when the data element has been written, the write cycle is terminated. Each time the read bar signal goes low during normal buffer operations, a read cycle for a data element, i.e., a byte of data, is initiated; the read bar signal reverts back to high before the initiation of the next read cycle. During a read cycle, a data byte is read from the buffer; when the data byte has been read, the read cycle is terminated.

As shown in FIG. 4A, when the write bar signal goes low for the second to the last available buffer location before the buffer becoming full, for storing a corresponding data element, the almost full flag AFF is caused to go low. In this embodiment, AFF being low represents the almost-full condition. If the program information specifies that the almost-full condition is to be monitored and indicated, AFF would be supplied to a corresponding buffer status pin. The arrow pointing from the falling edge of the write bar signal to the falling edge of AFF indicates that the former causes the latter. Thus, upon completion of two write cycles from the time the write bar signal went low which caused the assertion of the almost full flag, the buffer becomes full, provided that there is no intervening read cycle. Thereafter, when the second read bar signal after the buffer becomes full reverts to high, AFF is caused to revert to a high level, thus being deasserted. The arrow pointing from the rising edge of the second read bar signal after the buffer is full to the rising edge of AFF indicates that the former causes the latter. Upon the completion of two read cycles after the buffer is full, AFF has been deasserted, provided that there is no intervening write cycle.

As shown in FIG. 4B, when the read bar signal goes low for the second to the last buffer location containing a data element which has not yet been read, the almost empty flag AEF is caused to go low. In this embodiment, AEF being low represents the almost-empty condition. If the program information specifies that the almost-empty condition is to be monitored and indicated, AEF would be supplied to a buffer status pin. The arrow pointing from the falling edge of the read bar signal to the falling edge of AEF indicates that the former causes the latter. Thus, upon completion of two read cycles from the time the read bar signal went low which caused the assertion of the almost empty flag, the buffer becomes empty, provided that there is no intervening write cycle. Thereafter, when the second write bar signal after the buffer becomes full reverts to high, AEF is caused to revert to a high level, thus being deasserted. The arrow pointing from the rising edge of the second write bar signal after the buffer is full to the rising edge of AEF indicates that the former causes the latter. Upon the completion of two write cycles after the buffer is empty, AEF has been deasserted, provided that there is no intervening read cycle.

Figure 5:
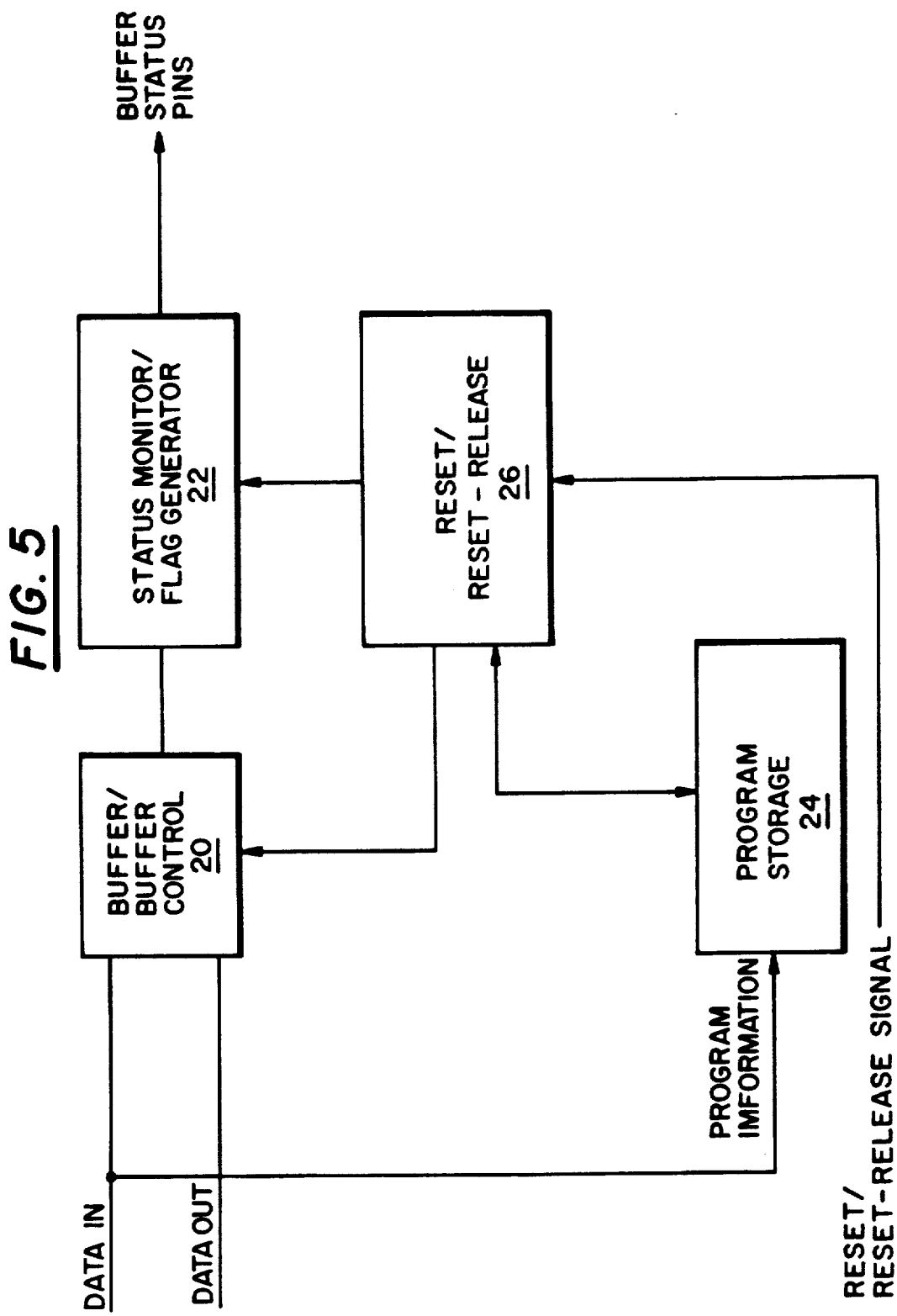
FIG. 5 is a block diagram illustrating the structural arrangement of a programmable buffer chip according to one embodiment of the invention.

FIG. 5 is a block diagram illustrating the structural arrangement of a programmable buffer chip according to one embodiment of the present invention. It is intended to be programmed by the above-described programming method of the present invention. Buffer/-Buffer Control section 20 includes a buffer having an array of cells for storing data elements, and corresponding access control circuitry for reading from and writing to the buffer. Status Monitor/Flag generator 22 represents circuitry for monitoring the status conditions of the buffer and for providing corresponding indications to buffer status pins, according to the program information entered into the buffer chip. The Program Storage section 24 represents circuitry which receives the program information during the period in which the buffer chip is programmed, and thereafter stores the received program information; the first and second program registers as described above are located in that section of the buffer chip. The Reset/Reset-Release section 26 represents circuitry which operates to reset the buffer chip in response to an applied reset signal placing the buffer chip in a reset mode, and which causes the buffer chip to exit from said reset mode to perform normal non-reset buffer operations in response to an applied reset-release signal. Resetting operations can include initializing pointers within the Status Monitor/Flag Generator 22 which point to certain current locations within the buffer, and initializing certain access circuitry within the buffer section 20. The connection between the Reset/Reset-Release section 26 and the Program Storage section 24 indicates that the latter operates to receive the program information during a period commencing from the end of an ordinary predetermined reset period and ending upon the application of said reset-release signal.

FIG. 6 is a block diagram illustrating the structural arrangement of a programmable buffer chip according to another embodiment of the invention. It is also intended to be programmed by the above-described programming method of the present invention. The structure is identical to that shown in FIG. 5, except for the addition of a Reset Inhibit function within the block 26 and a Data Direction Signal which is applied to the Program Storage section 24. The Reset Inhibit function is implemented by corresponding circuitry within block 26 which is responsive to an indication in the program information stored in the Program Storage section 24, to inhibit resetting which would otherwise occur upon the next occurence of the reset signal. In this embodiment, the Program Storage section is responsive to said Data Direction Signal to use one of two alternative sets of data pins indicated by the Data Direction Signal to receive the program information.

The block components within the block diagrams of FIGS. 5 and 6 are not explicitly described in further detail, as all can be constructed readily with conventional logic circuitry by one with ordinary skill in the art. Moreover, the exact circuitry for each block component varies from application to application, depending on the associated circumstance and on the construction of the other block components. A programmable buffer chip according to the present invention can be readily constructed by one with ordinary skill in the art, in light of the programming method as above-described. For instance, counters and comparators may be used to keep track of how many locations of the buffer have been written into, and how many locations have been read; and resetting may be accomplished by storing a predetermined value into a counter whose content identifies the next location to be written or read.

The foregoing description pertains merely to preferred embodiments of the invention. One with ordinary skill in the art should recognize that alternative embodiments, though not specifically disclosed, are also within the scope of the following claimed invention.

I claim:

1. A method for entering program information into a programmable memory device, said memory device being pin compatible and functionally interchangeable with a memory device designed for use as a non-programmable memory device, said programmable memory device comprising data storage means, at least one flag program register, compatible input data pins, compatible output data pins, compatible condition/status pins, compatible read/write control pins, and a compatible reset pin, the method for entering the program information comprising the steps of:

applying an active reset clock signal having at least a first duration to said compatible reset pin, the memory device being set to reset mode during said first duration;

maintaining said reset clock signal active for a second duration after said first duration, the memory device being set to program mode during said second duration;

inputting at least a first active enable signal to one of said compatible read/write control pins during said second duration;

inputting via one of said compatible input pins and said compatible output pins at least a portion of said program information during said second duration;

storing said program information into said at least one flag program register during said second duration;

inputting a second active enable signal to one of said compatible read/write control pins after said second duration;

inputting via said compatible input pins non-program data into said data storage means when said second active enable signal corresponds to a write operation;

outputting non-program data via said compatible output pins from said data storage means when said second active enable signal corresponds to a read operation; and outputting, in response to said second active enable signal, data buffer condition/status data via said compatible condition/status pins, said condition/status data for providing the programmably requested status, as defined in the flag program register, of data currently stored in the data storage means, wherein said programmable memory device is reset during said reset mode in response to a first value of a programmed bit currently stored in said at least one flag register, and wherein said programmable memory device is not reset during said reset mode when the value of said programmed bit is other than said first value.

2. A method for entering program information into a programmable memory device, said memory device being pin compatible and functionally interchangeable with a memory device designed for use as a non-programmable memory device, said programmable memory device comprising data storage means, at least one flag program register, compatible input data pins, compatible output data pins, compatible condition/status pins, compatible read/write control pins, and a compatible reset pin, the method for entering the program information comprising the steps of:

applying an active reset clock signal having at least a first duration to said compatible reset pin, the memory device being set to reset mode during said first duration;

maintaining sad reset clock signal active for a second duration after said first duration, the memory device being set to program mode during said second duration;

inputting at least a first active enable signal to one of said compatible read/write control pins during said second duration;

inputting via one of said compatible input pins and said compatible output pins at least a portion of said program information during said second duration;

storing said program information into said at least one flag program register during said second duration;

inputting a second active enable signal to one of said compatible read/write control pins after said second duration;

inputting via said compatible input pins non-program data into said data storage means when said second active enable signal corresponds to a write operation;

outputting non-program data via said compatible output pins from said data storage means when said second active enable signal corresponds to a read operation; and outputting, in response to said second active enable signal, data buffer condition/status data via said compatible condition/status pins, said condition/status data for providing the programmably requested status, as defined in the flag program register, of data currently stored in the data storage means.

wherein said at least a first active enable signal further includes a data direction signal which selectively determines the inputting direction of said program information via either said compatible input pin or said compatible output pins.

3. A method for entering into a programmable buffer chip program information determinative of buffer status conditions monitored by at least one buffer status pin, in a period disguised as an extended period for extended resetting, to achieve compatibility between the programmable buffer chip and a nonprogrammable basic buffer chip of the same number of I/O pins, said basic buffer chip being responsive to a reset signal to enter a reset mode for resetting and thereafter to a reset release signal for exiting the reset mode, comprising the steps of:

- applying to the programmable buffer chip a reset signal causing the buffer chip to enter a reset mode for a period of predetermined minimal duration in which it is reset to a predetermined initial condition;
- refraining from applying to the programmable buffer chip a reset-release signal which would cause the buffer chip to enter a normal mode for engaging in non-reset buffer operations, for an extended period beyond said predetermined reset period, thus creating a time window disguised as an extended reset period for entering program information into the programmable buffer chip;
- inputting, during said disguised reset period, program information into the programmable buffer chip, said program information for determining the selection of buffer status conditions which are to be monitored by said at least one buffer status pin when the programmable buffer chip is in said normal mode; and
- applying to the programmable buffer chip said reset-release signal, after said inputting step, thus placing said programmable buffer chip in the normal mode;
- whereby said programmable buffer chip is made compatible with said basic buffer chip and wherein:
- a portion of said program information indicates whether the programmable buffer chip will inhibit from entering the reset mode to engage in reset operation, upon the occurrence of said reset signal;
- whereby when the program information in store within the programmable buffer chip indicates such an inhibition, said programmable buffer chip is operative to inhibit from entering the reset mode upon the next application of said reset signal.

4. A method for entering into a programmable buffer chip program information determinative of buffer status conditions monitored by at least one buffer status pin, in a period disguised as an extended period for extended resetting, to achieve compatibility between the programmable buffer chip and a nonprogrammable basic buffer chip of the same number of I/O pins, said basic buffer chip being responsive to a reset signal to enter a reset mode for resetting and thereafter to a reset-release signal for exiting the reset mode, comprising the steps of:

- applying to the programmable buffer chip a reset signal causing the buffer chip to enter a reset mode for a period of predetermined minimal duration in which it is reset to a predetermined initial condition;
- refraining from applying to the programmable buffer chip a reset-release signal which would cause the buffer chip to enter a normal mode for engaging in non-reset buffer operations, for an extended period beyond said predetermined reset period, thus creating a time window disguised as an extended reset period for entering program information into the programmable buffer chip;
- inputting, during said disguised reset period, program information into the programmable buffer chip, said program information for determining the selection of buffer status conditions which are to be monitored by said at least one buffer status pin when the programmable buffer chip is in said normal mode; and
- applying to the programmable buffer chip said reset-release signal, after said inputting step, thus placing said programmable buffer chip in the normal mode;
- whereby said programmable buffer chip is made compatible with said basic buffer chip and wherein:
- said inputting step includes the step of applying a direction signal to said programmable buffer chip indicating whether program information are to be inputted through data pins otherwise used for inputting data elements into a buffer memory during the normal mode or through data pins otherwise used for outputting data elements from the buffer memory during the normal mode, said direction signal being applied to a pin of said programmable buffer chip which corresponds to a control pin in the basic buffer chip which has no functional significance during resetting of the basic buffer chip,
- wherein during said inputting step, said program information is inputted through pins indicated by said direction signal.

5. A method for entering into a programmable buffer chip program information determinative of buffer status conditions monitored by at least one buffer status pin, in a period disguised as an extended period for extended resetting, to achieve compatibility between the programmable buffer chip and a nonprogrammable basic buffer chip of the same number of I/O pins, said basic buffer chip being responsive to a reset signal to enter a reset mode for resetting and thereafter to a reset-release signal for exiting the reset mode, comprising the steps of:

- applying to the programmable buffer chip a reset signal causing the buffer chip to enter a reset mode for a period of predetermined minimal duration in which it is reset to a predetermined initial condition;
- refraining from applying to the programmable buffer chip a reset-release signal which would cause the buffer chip to enter a normal mode for engaging in non-reset buffer operations, for an extended period beyond said predetermined reset period, thus creating a time window disguised as an extended reset period for entering program information into the programmable buffer chip;
- inputting, during said disguised reset period, program information into the programmable buffer chip, said program information for determining the selection of buffer status conditions which are to be monitored by said at least one buffer status pin when the programmable buffer chip is in said normal mode; and
- applying to the programmable buffer chip said reset-release signal, after said inputting step, thus placing said programmable buffer chip in the normal mode;

whereby said programmable buffer chip is made compatible with said basic buffer chip and wherein:

said program information includes a particular indication of whether the same or different buffer status condition monitored by said at least one buffer status pin of the basic buffer chip would be monitored by a respectively corresponding buffer status pin of the programmable buffer chip.

6. A method as recited in claim 5, wherein:

both a buffer memory in said programmable buffer chip and in said basic buffer chip maintain a first-in-first-out sequence of data transfer.

7. A method as recited in claim 6, wherein:

said reset signal is a signal level applied to the reset pin of the programmable buffer chip;

said reset-release signal is another signal level applied to the reset pin of the programmable buffer chip.

8. A method as recited in claim 5, wherein:

a portion of sad program information indicates whether the programmable buffer unit will inhibit from entering the reset mode to engage in reset operations, upon the occurrence of said reset signal;

whereby when the program information already entered into the programmable buffer chip indicates such an inhibition, said programmable buffer chip is operative to inhibit from entering the reset mode upon the next application of said reset signal.

9. A method as recited in claim 8, wherein:

said inputting step includes the step of applying a direction signal to said programmable buffer chip indicating whether program information are to be inputted through data pins otherwise used for inputting data elements into the buffer during the normal mode or through data pins otherwise used for outputting data elements from the buffer during the normal mode;

said direction signal being applied to a pin of said programmable buffer chip which corresponds to a control pin in the basic buffer chip which has no functional significance during resetting of the basic buffer chip;

during said inputting step, said program information is inputted through pins indicated by said direction signal.

10. A method as recited in claim 5, wherein:

said inputting step includes the step of applying a directions signal to said programmable buffer chip indicating whether program information are to be inputted through data pins otherwise used for inputting data elements into the buffer during the normal mode or through data pins otherwise used for outputting data elements from the buffer during the normal mode;

said direction signal being applied to a pin of said programmable buffer chip which corresponds to a control pin in the basic buffer chip which has no functional significance during resetting of the basic buffer chip;

during said inputting step, said program information is inputted through pins indicated by said direction signal.

11. A method as recited in claim 5, wherein:

said basic buffer chip includes two buffer status pins and said programmable buffer chip includes two corresponding buffer status pins;

the first status pin of said basic buffer chip indicates the buffer full condition;

the second status pin of said basic buffer chip indicates the buffer empty condition;

when said particular indication specifies that the same buffer status conditions monitored by said first and second status pins of the basic buffer chip are to be monitored by corresponding first and second status pins in the programmable buffer chip, the first status pin of said programmable buffer chip indicates the buffer full condition; and the second status pin of the programmable buffer chip indicates the buffer empty condition.

12. A method as recited in claim 11, wherein:

when said particular indication specifies that buffer status conditions different from those monitored by said first and second status pins of the basic buffer chip are to be monitored by corresponding first and second status pins of the programmable buffer chip, the first status pin of said programmable buffer chip indicates the buffer almost-full condition at which the buffer is full but for a number of locations specified by a first offset data included in said program information; and the second status pin of the programmable buffer chip indicates the buffer almost-empty condition at which the buffer is empty but for a number of locations specified by a second offset data included in said program information.

13. A method as recited in claim 12, wherein;

said particular indication in said program information includes said first offset data and said second offset data;

a first offset data of a predetermined value indicates that the first buffer status pin of said programmable buffer chip will indicate the buffer full condition, like the first buffer status pin of the basic buffer chip;

a second offset data of a predetermined value indicates that the second buffer status pin of said programmable buffer chip will indicate the buffer empty condition, like the second buffer status pin of the basic buffer chip.

14. A method as recited in claim 13, wherein:

a value of said first offset data other than said predetermined value indicates that the first buffer status pin of said programmable buffer chip will indicate said buffer almost-full condition according to the offset specified by said first offset data;

a value of said second offset data other than said predetermined value indicates that the second buffer status pin of said programmable buffer chip will indicate said buffer almost-empty condition according to the offset specified by said second offset data.

15. A method as recited in claim 14, wherein:

said program information includes two data words; one data word includes said first offset data and another data word includes said second offset data; and during said inputting step, said first and second data words are inputted into said programmable buffer chip in sequence.

16. A method as recited in claim 12, wherein:

said basic buffer chip includes a third buffer status pin and said programmable buffer chip includes a corresponding third buffer status pin;

said buffer status pin of said basic buffer chip monitors a buffer condition intermediate the full and the empty condition;

when said particular indication specifies that the same buffer status condition as that monitored by the third buffer status pin of the basic buffer chip is to be monitored by a corresponding buffer status pin in the programmable buffer chip, said third status pin of the programmable buffer chip monitors the same condition as that monitored by said third buffer status pin of the basic buffer chip.

17. A method as recited in claim 16, wherein:

when said particular indication specifies that a buffer status condition different from that monitored by the third buffer status pin of the basic buffer chip is to be monitored by a corresponding buffer status pin of the programmable buffer chip, said third status pin of the programmable buffer chip monitors both the buffer full condition and the buffer empty condition.

18. A method as recited in claim 17, wherein:

said particular indication in said program information includes a program indicator bit;

one binary level of said program indicator bit indicates that the same condition monitored by said third buffer status pin of the basic buffer chip is to be monitored by the corresponding third buffer status pin of the programmable buffer chip;

the other binary level of said program indicator bit indicates that said condition different from that monitored by the third buffer status pin of the basic buffer chip is to be monitored by the corresponding third buffer status pins of the programmable buffer chip.

19. A method as recited in claim 18, wherein:

said particular indication in said program information includes said first offset data and said second offset data;

a first offset data of a predetermined value indicates that the first buffer status pin of said programmable buffer chip will indicate the buffer full condition, like the first buffer status pin of the basic buffer chip;

a second offset data of a predetermined value indicates that the second buffer status pin of said programmable buffer chip will indicate the buffer empty condition, like the second buffer status pin of the basic buffer chip.

20. A method as recited in claim 19, wherein:

a value of said first offset data other than said predetermined value indicates that the first buffer status pin of said programmable buffer chip will indicate said buffer almost-full condition according to the offset specified by said first-offset data;

a value of said second offset data other than said predetermined value indicates that the second buffer status pin of said programmable buffer chip will indicate said buffer almost-empty condition according to the offset specified by said second offset data.

21. A method as recited in claim 20, wherein:

said reset signal is a signal level applied to the reset pin of the programmable buffer chip;

said reset-release signal is another signal level applied to the reset pin of the programmable buffer chip.

22. A method as recited in claim 17, wherein:

said reset signal is a signal level applied to the reset pin of the programmable buffer chip;

said reset-release signal is another signal level applied to the reset pin of the programmable buffer chip.

23. A method as recited in claim 17, wherein:

both the buffer on said programmable buffer chip and on said basic buffer chip maintain a first-in-first-out sequence of data transfer.

24. A method as recited in claim 17, wherein:

each said first and second offset data is a binary value of which each increment corresponds to a two byte offset in the programmable buffer.

25. A method as recited in claim 17, wherein;:

said particular indication in said program information is a single program indicator bit;

one binary level of said program indicator bit indicates that the same conditions monitored by the first, second, and third buffer status pins of the basic buffer chip are to be monitored by corresponding first, second, and third buffer status pins of the programmable buffer chip;

the other binary level of said program indicator bit indicates that conditions different from those monitored by the first, second, and third buffer status pin of the basic buffer chip, are to be monitored, respectively, by corresponding first, second, and third buffer status pins of the programmable buffer chip.

26. A method as recited in claim 25, wherein:

said reset signal is a signal level applied to the reset pin of the programmable buffer chip;

said reset-release signal is another signal level applied to the reset pin of the programmable buffer chip.

* * * * *